United States Patent [19]

Buck

[11] 4,171,382

[45] Oct. 16, 1979

[54] METHOD OF COOKING MEATS IN A MICROWAVE OVEN

[75] Inventor: Ronald G. Buck, Burnsville, Minn.

[73] Assignee: Litton Systems, Inc., Beverly Hills, Calif.

[21] Appl. No.: 829,080

[22] Filed: Aug. 30, 1977

[51] Int. Cl.$^2$ ............................. A23L 1/31; H05B 9/06
[52] U.S. Cl. .................................... 426/243; 426/523; 219/10.55 E; 219/10.55 M
[58] Field of Search ............... 426/233, 241, 243, 523; 219/10.55 M, 10.55 B, 10.55 R

[56] References Cited

U.S. PATENT DOCUMENTS

| | | | |
|---|---|---|---|
| 3,467,804 | 9/1969 | Smith | 219/10.55 |
| 3,839,616 | 10/1974 | Risman | 219/10.55 |
| 4,080,564 | 3/1978 | Nitta et al. | 219/10.55 B |

FOREIGN PATENT DOCUMENTS 2312067  1/1977  France ............................. 219/10.55 B

OTHER PUBLICATIONS

Schmidt, A. X. et al., "Material and Energy Balances", Prentice Hall, Inc., Englewood Cliffs, N.J. 1962, pp. 227–246.

*Primary Examiner*—Robert A. Yoncoskie
*Attorney, Agent, or Firm*—Robert E. Lowe

[57] ABSTRACT

A method of cooking meat in a microwave oven by determining the mean internal temperature of the meat which is indicative of the internal doneness of meat as a function of sensed and sampled time dependent humidity and temperature of the microwave oven heating cavity. The mean internal temperature of the meat is determined as a function of the initial temperature of the meat; a net heat loss due to surface evaporation; a net input of energy by the microwave power source, and a net convective heat loss.

4 Claims, 3 Drawing Figures

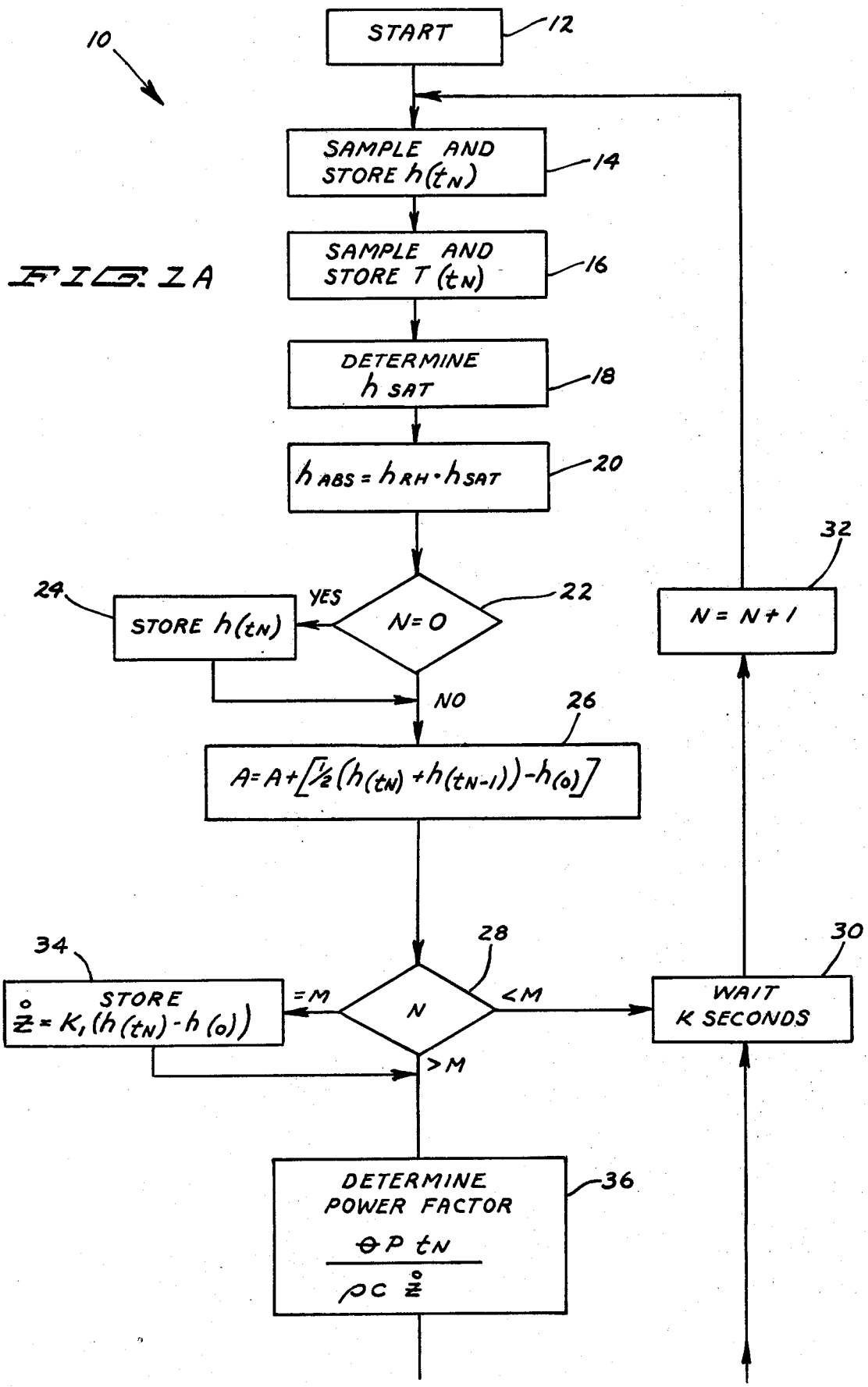

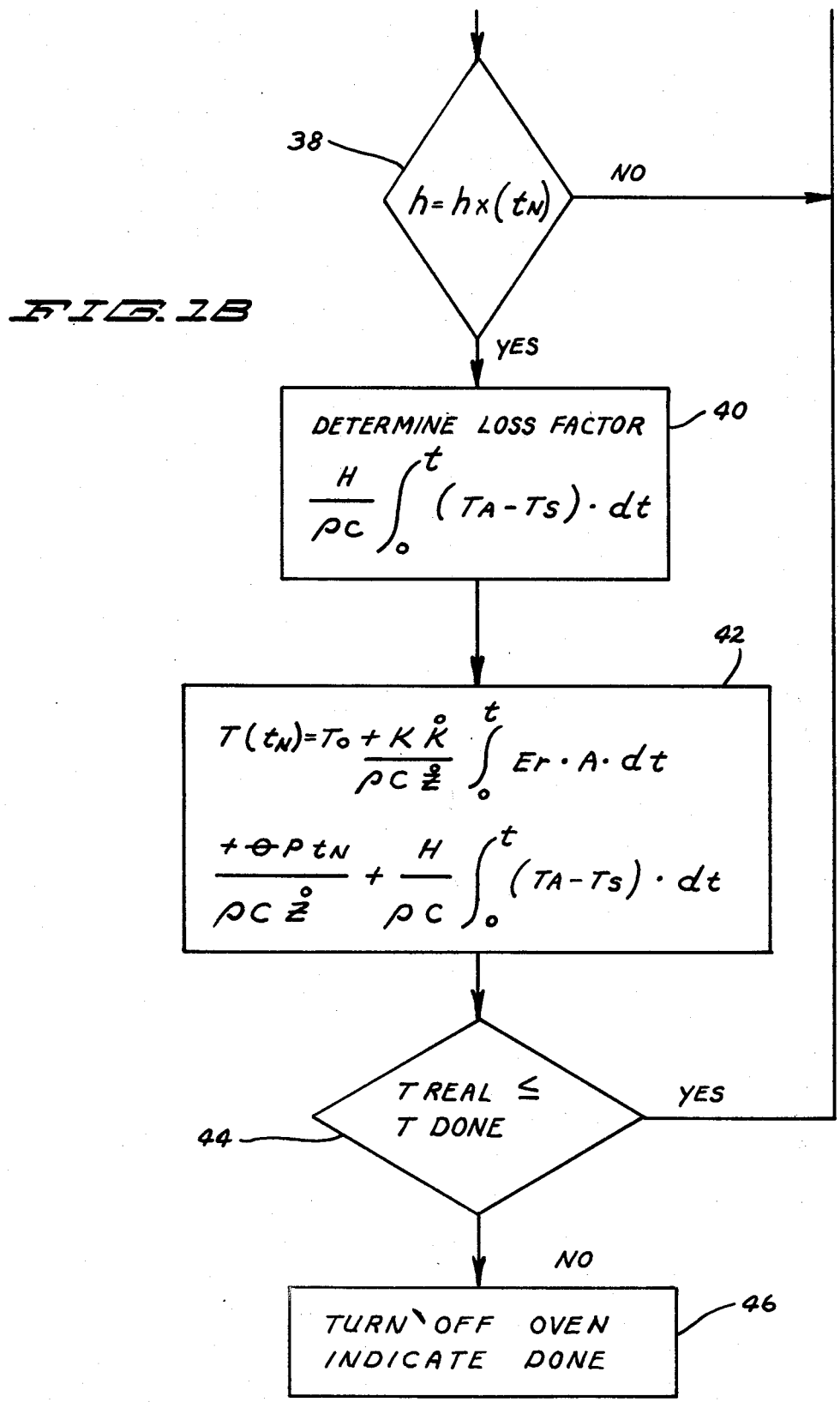

METHOD OF COOKING MEATS IN A MICROWAVE OVEN

BACKGROUND OF THE INVENTION

1. Field of the Invention

The present invention relates generally to improvements in microwave ovens, and more particularly, pertains to a new and improved method of cooking of meat in a microwave oven.

2. Description of the Prior Art

Those concerned with microwave heating of meat have long recognized the need to accurately determine the temperature which is indicative of the internal doneness of the meat being cooked in a microwave oven. The present invention fills this need.

Past prior art devices have not been extremely reliable in determining the temperature of meat being cooked in a microwave oven. Initial prior art attempts at determining the temperature of meat was to insert a thermometer into the piece of meat being cooked which was not affected by the microwave energy radiation, but the disadvantage was that the thermometer only indicated the internal temperature of the meat at one particular location and was not a true overall indication of the equilibrium internal temperature of the meat which is indicative of internal doneness of the meat.

Another current prior art device for measuring the internal temperature of meat being cooked is to insert a temperature probe into the meat while in the microwave oven heating cavity which connects to the control circuitry of the microwave oven. While the temperature probe is accurate in indicating the temperature of the meat being cooked by microwave energy, the probe only senses the temperature of the immediate area surrounding the probe and does not take into account the equilibrium state of the internal temperature of the meat. If the temperature of the meat is not uniform and the probe is placed at a hot spot in the meat, the readings from the temperature probe are not indicative of the mean internal temperature of the meat.

Further, the probe which is inserted into the meat is cumbersome and bulky for the cook who is trying to monitor the temperature of the meat during the microwave cooking in the microwave oven heating cavity.

This invention, a method of cooking meat in a microwave oven, overcomes the disadvantages of prior art by providing an accurate method for determining the temperature of meat which is indicative of the internal doneness of the meat.

SUMMARY OF THE INVENTION

The present invention obviates the foregoing disadvantages of the prior art by providing a method of cooking meat in a microwave oven.

According to the preferred embodiment of the present invention, there is provided a method for cooking of meat in a microwave oven having the steps of sampling the time dependent "in-situ" humidity and temperature environmental conditions of a microwave oven heating cavity, determining the absolute humidity from the sampled "in-situ" humidity and temperature, and determining the mean internal temperature of the meat as a function of the initial temperature, the integral of a "characteristic humidity curve" of the absolute humidity indicative of the net heat loss due to surface evaporation, and the net input of energy by the microwave power source, and the net convective heat loss. If the temperature of the meat is equal to or greater than a predetermined temperature, then the microwave oven is turned off and an indicate done signal is provided for the cook.

A significant aspect and feature of the present invention is a method which provides for the determination of the temperature of the meat which is indicative of the internal doneness of meat being cooked in a microwave oven. A cook, by knowing the temperature of the meat at any time during the cooking period, can determine the optimum time to turn the meat over, what time to baste the meat, etc., or more importantly, when the meat is done cooking.

Having briefly described the preferred embodiment of the present invention, it is a principal object to provide a method of cooking meat in a microwave oven.

An object of the present invention is to provide a method for determining the mean internal temperature of the meat which is indicative of the internal doneness of the meat while being cooked in a microwave oven.

Another object of the invention is provide a method determining when the piece of meat is cooked to internal doneness by sensing the time dependent "in-situ" humidity and temperature environment conditions of the microwave oven heating cavity with humidity and temperature sensors.

The term "in-situ" as used in this application is defined as the actual environmental conditions which exist in the environment surrounding the food product such as meat which is located in and cooked in the microwave oven heating cavity. Although in the present invention, the humidity sensor and the temperature sensor may be positioned outside of the microwave oven heating cavity, the sensors are configured to sense the time dependent "in-situ" environmental conditions of the microwave oven heating cavity and provide "in-situ" signal information of the time dependent environmental conditions of the microwave oven heating cavity to a programmable controller controlling the microwave oven.

A further object of the invention is to provide for control of the microwave oven to indicate that the piece of meat is cooked to doneness and to turn off the microwave oven upon reaching a predetermined temperature indicating doneness of the meat. This increases the convenience and overall efficiency of the microwave cooking as well as the palatability of the food.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like elements throughout the figures thereof and wherein:

FIGS. 1A and 1B illustrate a flow chart of the method of cooking meat in a microwave oven in accordance with the present invention.

DESCRIPTION OF THE PREFERRED EMBODIMENT

Figure 2:
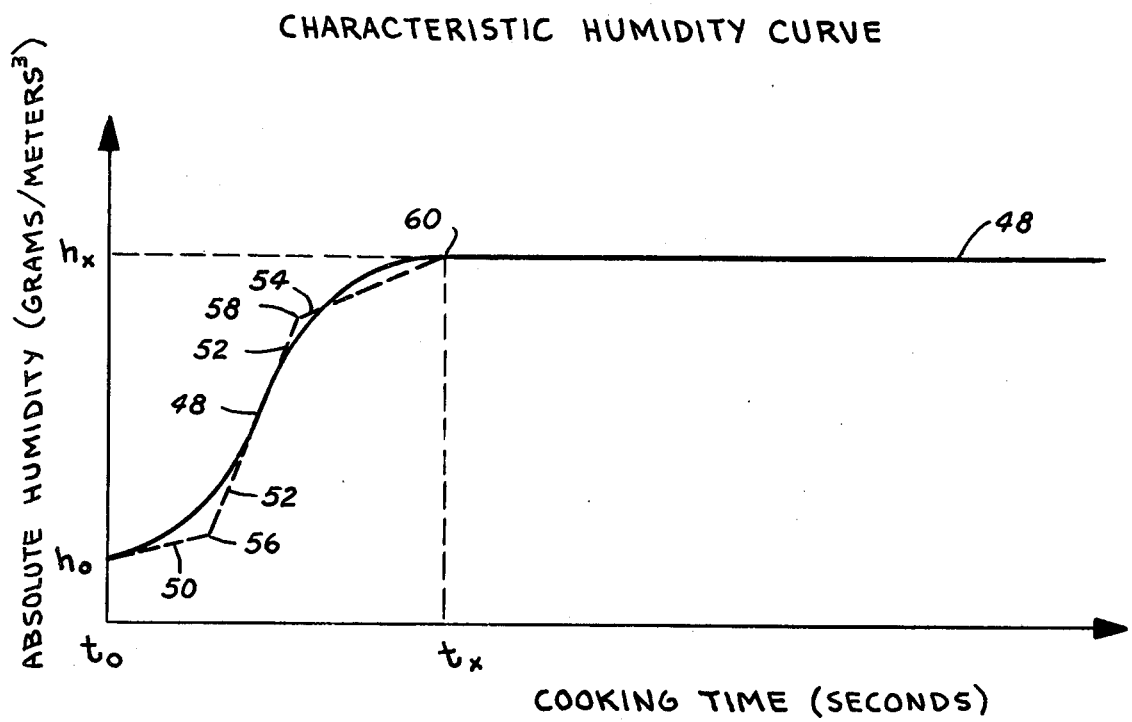
FIG. 2 illustrates a typical "characteristic humidity curve" for the present invention.

FIG. 1 illustrates a flow chart 10 of an algorithm for the method in accordance with the present invention. The method in algorithm form provides for determining the mean internal temperature of the meat being cooked in a microwave oven, which is indicative of the internal doneness of the meat.

The generalized equation for the mean internal temperature of meat is expressed by equation 1 where $$T = T_o + \frac{\chi}{Z} \int_0^t E_r[H(t) - h(0)] \cdot dt + \text{Power Factor} + \text{Loss Factor} \quad \text{Eq. 1}$$

and $T_o$ is the initial temperature of the meat; $\chi$ is a constant proportional to the thermal conductivity of the meat, the density of the meat, and the specific heat of the meat; $\mathring{Z}$ is a constant equal to the thickness of the meat; $E_r$ is a constant equal to the air exchange rate through the microwave oven heating cavity, and; h(t) is the absolute humidity at time $t_N$ during the cooking period.

The Power Factor is expressed by equation 2 where the $$\text{Power Factor} = \frac{\theta P_{t_N}}{\rho C \mathring{Z}} \quad \text{Eq. 2}$$

and $\theta$ is a constant equal to the power constant of the microwave power source; $P_{tN}$ is a constant equal to the duty cycle constant of the microwave power source during a cooking time interval of the microwave oven; $\rho$ is a constant equal to the density of the meat; C is a constant equal to the specific heat of the meat; and $\mathring{Z}$ is a constant equal to thickness of the meat.

The loss factor of the convective heat loss is expressed by equation 3 where the $$\text{Loss Factor} = \frac{H}{\rho C} \int_0^t (T_A - T_s) \cdot dt \quad \text{Eq. 3}$$

and H is a constant equal to the convective heat transfer coefficient of the meat; $\rho$ is a constant equal to the density of the meat; C is a constant equal to the specific heat of the meat; $T_A$ is equal to the ambient temperature of the microwave oven heating cavity at time $T_N$; and $T_s$ is equal to the surface temperature of the meat at time $T_N$.

The generalized equation 1 for the temperature of meat is rewritten as equation 4 which is the equation for the mean internal temperature of meat which is indicative of the internal doneness of the meat where $$T = T_o + \frac{K\mathring{K}}{\rho C \mathring{Z}} \int_0^t E_r[h(t) - h(0)] \cdot dt + \frac{\theta P_t}{\rho C \mathring{Z}} + \frac{H}{\rho C} \int_0^t (T_A - T_s) \cdot dt \quad \text{Eq. 4}$$

where K is the thermal conductivity constant of the meat and $\mathring{K}$ is the evaporation loss constant of the meat.

The first component, $T_o$, of equation 4 is the initial temperature of the meat; the second component of equation 4 is the component which effects the internal temperature of the meat by a net heat loss due to evaporation; the third component of equation 4, the power factor, is the component which effects internal temperature of the meat by a net input of energy by the microwave power source, and; the fourth component of equation 4, the loss factor, is the component which effects internal temperature of the meat by a net convective heat loss. The addition of the four components of equation 4 equal the mean internal temperature of meat being cooked in a microwave oven.

The flow chart 10 of FIG. 1 provides the algorithmic steps to determine the mean internal temperature which is indicative of the internal doneness of the meat being cooked in the microwave oven and initiates at start 12. The relative humidity $h(t_N)$ 14 and the temperature $T(t_N)$ time dependent "in-situ" environmental conditions of the microwave oven heating cavity are sampled and stored. The saturated humidity 18 is determined from the sensed time dependent "in-situ" environmental conditions of relative humidity and temperature of the microwave oven heating cavity. The absolute humidity 20 is then determined from the sampled and stored time dependent "in-situ" relative humidity $h(t_N)$ 14 of the microwave oven heating cavity times the saturated humidity 18. If an N equal zero YES condition 22 exists at $t_N$, the absolute humidity at $t_N$ is stored at step 24, but if a N equal zero NO condition 22 exists at $t_N$, then the absolute humidity determined at step 20 is utilized in the subsequent computations. The area "A" at step 26 under the "characteristic humidity curve" of the absolute humidity determined at step 20 in grams per cubic meter versus cooking time in seconds is computed at time $t_N$. If an N less than M condition 28 exists, the algorithm waits K seconds at step 30 where K is a predetermined time constant, increments N by one at step 32, and again samples and stores the relative humidity $h(t_N)$ 14 and temperature $T(t_N)$ 16 in repeating the steps of the algorithm. If an N equals M condition 28 exists, then $\mathring{Z}$ is equal to the initial slope of the "characteristic humidity curve" times a predetermined constant $K_1$. If an N greater than M condition exists, the power factor 36 is determined. If a peak absolute humidity NO condition 38 exists where peak absolute humidity has not been reached, then the algorithm advances to the wait K seconds at step 30. If a peak absolute humidity YES condition 38 exists, then the algorithm advances to the determination of the convective loss factor 40. The mean internal temperature 42, equation 4, of the meat is subsequently determined from the components of the initial temperature of the meat; the component of the internal temperature by a net heat loss due to evaporation; the component of the internal temperature by a net input of energy from the microwave power source, and; the component of the internal temperature by a net convective heat loss. If a temperature is less than or equal to temperature done, a YES 44 condition exists and the algorithm repeats through step 30. If the temperature is greater than temperature done, a NO 44 conditions exists and the microwave oven is turned off by a programmable controller and an indicate done signal is provided for the cook.

Preferred Mode of Operation

The method of cooking meat in a microwave oven is premised on the sensing concept based on the most fundamental cooking principles. That is, as microwave energy is converted to thermal energy, the mean internal temperature of the meat increases, some of the thermal energy is used to break the bonding forces holding the water molecules to the food's cell structure. When sufficient heat equal to the latent heat of vaporization has been added to the food, these free water molecules are vaporized and released locally. Thus, the rate of evaporation is directly proportional to the rate of temperature rise. By monitoring the microwave oven heating cavity time dependent "in-situ" humidity and temperature environmental conditions of the microwave oven heating cavity, it is possible to determine the meat's mean internal temperature for a piece of meat in conjunction with "characteristic humidity curve" 48 of FIG. 2.

The "characteristic humidity curve" 48 of absolute humidity in grams per cubic meters versus cooking time in seconds of FIG. 2 is determined by sensing the time dependent "in-situ" relative humidity and temperature environmental conditions of the microwave oven heating cavity during microwave cooking of meat. The time dependent "in-situ" environmental conditions are defined as the sensed humidity and temperature of the microwave oven heating cavity and are determined by humidity and temperature sensors. Each particular type of meat has its own particular "characteristic humidity curve". $h_o$ is the initial absolute humidity and $h_x$ is the peak absolute humidity at the time $t_x$ of the "characteristic humidity curve" 48.

The "characteristic humidity curve" 48 of FIG. 2 may be approximated as a three segment 50, 52 and 54 piecewise linear curve prior to time $t_x$. The slope of the first segment 50 of the three segment piecewise linear curve is proportional to the rise in surface temperature of the food up to one hundred centigrade. Once the hottest section of the surface has reached one hundred degrees centigrade which occurs at the change of slope 56, the humidity increases rapidly as illustrated by the slope of the second segment 52 of the three segment piecewise linear curve which is due to the "latent heat of vaporization" of the food. The change of slope 58 is indicative of the beginning of the surface temperature of the food reaching equilibrium. The slope of the third segment 54 of the three segment piecewise linear curve from point 58 to 60 is equilibrium occuring of the surface temperature of the food. The "characteristic humidity curve" 48 plateaus at point 60, the peak absolute humidity indicating that the surface temperature of the meat has reached equilibrium of one hundred degrees centigrade.

The rate of surface evaporation of the meat is proportional to the rate of temperature rise, and that the total rate of surface evaporation is proportional to the sum of the rates of evaporation of each incremental segment of the internal temperature gradient. The integral of the "characteristic humidity curve" of FIG. 2 is directly related to the component which effects the internal temperature of the meat by a net heat loss due to evaporation.

The method is implemented in accordance with the flow chart 10 of FIGS. 1A and 1B as an algorithm stored in a programmable controller such as an Intel 8080 Microprocessor. The algorithm of FIGS. 1A and 1B determines the mean internal temperature of the meat which is indicative of internal doneness.

An aluminum oxide humidity sensor, such as a Thunder Scientific TC-2000 Humidity Measurement Module, and a temperature sensor, such as a National Semiconductor Corporation LX 5700 Temperature Transducer, may be positioned adjacent to and by the exit ventilation port to the exterior side of the microwave oven heating cavity for way of example and for purposes of illustration only to sense the time dependent "in-situ" environmental conditions internal to the microwave oven heating cavity. The sensors are positioned to sense the time dependent "in-situ" environmental conditions of the microwave oven heating cavity and are electromagnetically isolated from the microwave oven heating cavity. The humidity sensor and the temperature sensor connect to the programmable controller having the steps of the algorithm of FIG. 1 stored in the memory of the programmable controller. The programmable controller connects to the microwave power source power supply and the air exchange circuit and turns the oven off when a NO condition 46 exists indicating that temperature done has been reached.

The algorithm of the method of FIG. 1A and 1B determines the mean internal temperature according to the equation of step 42 as a function of the initial temperature of the meat, the first component of the equation of step 42; the internal temperature of the meat which is effected by a net heat loss due to evaporation, the second component of the equation of step 42; the power factor which effects the internal temperature of the meat by a net input of energy by the microwave power source as determined at step 36, the third component of equation of step 42; and the loss factor which effects the internal temperature of the meat by a net convective heat loss. The four factors are determined from the sampled and sensed humidity and temperature "in-situ" environmental conditions of the microwave oven heating cavity according to steps 14–26. The programmable controller performing the steps 12–46 of the algorithm turns the microwave oven off and indicates done at step 46 upon determining a $t_{real}$ which is greater than a $t_{done}$ at step 46 indicating that the meat has reached its desired mean internal temperature indicative of the internal doneness of the meat.

Various modifications can be made to the method of cooking meat in a microwave oven of the present invention without departing from the apparent scope of this invention.

Having thus described the invention, what is claimed is:

1. A method for cooking meat in a microwave oven of the type having means for measuring the humidity and temperature of the oven heating cavity, and having oven control means including a programmable microprocessor for receiving signals indicative of said measured humidity and temperature, said method comprising the steps of:
    (a) energizing a microwave energy source to provide microwave energy to said oven heating cavity whereby a substantial portion of said energy is absorbed by a meat body located in said oven heating cavity;
    (b) measuring the humidity and temperature of said oven heating cavity at a plurality of time-spaced intervals as said meat body is heated and providing signals indicative of said measured quantities to said microprocessor;
    (c) calculating in said microprocessor a humidity-time curve described by said measured quantities and determining in said microprocessor the area under said curve;
    (d) comparing in said microprocessor said calculated area with the area of a predetermined characteristic humidity-time curve for meat bodies stored in a memory portion of said microprocessor and calculating in said microprocessor from said comparison the net heat loss due to evaporation, a microwave power absorption factor and a power loss factor for said meat body;

(e) further calculating in said microprocessor the mean internal temperature of said meat body as a function of the sum of its initial temperature said net evaporative heat loss, said microwave power absorption factor and said power loss factor;

(f) comparing in said microprocessor said calculated mean internal temperature with an operator selected doneness temperature for said meat body; and, (g) de-energizing said microwave energy source when said operator selected doneness temperature is reached.

2. The method of claim 1 wherein said net heat loss due to evaporation is calculated by integrating in said microprocessor the rate of change of humidity with respect to time and multiplying said integral in said microprocessor by a constant derived from the physical properties of said meat body and stored in said memory portion of said microprocessor.

3. The method of claim 1 wherein said microwave power absorption factor is calculated from the expression:

$$\text{Power factor} = \frac{\theta P_N}{\rho C \overset{\cdot}{Z}}$$

wherein $\theta$ is a constant proportional to the power output of said microwave energy source; $P_n$ is the duty cycle of the oven at time interval N; $\rho$ is the density of the meat; C is the specific heat of the meat; and $\overset{\cdot}{Z}$ is a constant proportional to the thickness of the meat.

4. The method of claim 1 wherein steps (b) through (f) are repeated at consecutive intervals and wherein said calculated mean internal temperature is recalculated at each said interval for the purpose of determining the required done temperature.

* * * * *